(12) United States Patent
Cronan

(10) Patent No.: US 10,949,385 B2
(45) Date of Patent: Mar. 16, 2021

(54) HYBRID METADATA AND FOLDER BASED FILE ACCESS

(71) Applicant: 5th Kind LLC, Culver City, CA (US)

(72) Inventor: Stephen Cronan, Los Angeles, CA (US)

(73) Assignee: 5th Kind LLC, Culver City, CA (US)

( * ) Notice: Subject to any disclaimer, the term of this patent is extended or adjusted under 35 U.S.C. 154(b) by 0 days.

(21) Appl. No.: 15/931,305

(22) Filed: May 13, 2020

(65) Prior Publication Data

US 2021/0004354 A1    Jan. 7, 2021

Related U.S. Application Data

(63) Continuation of application No. 16/503,926, filed on Jul. 5, 2019, now Pat. No. 10,691,639.

(51) Int. Cl.
*G06F 16/13* (2019.01)
(52) U.S. Cl.
CPC .................................. *G06F 16/13* (2019.01)
(58) Field of Classification Search
CPC ............................... G06F 16/188; G06F 16/13

USPC .................. 707/827, 829, 830, 821, 822, 82
See application file for complete search history.

(56) References Cited

U.S. PATENT DOCUMENTS

| | | | |
|---|---|---|---|
| 2002/0156840 | A1 | 10/2002 | Ulrich et al. |
| 2006/0242164 | A1 | 10/2006 | Evans et al. |
| 2009/0125522 | A1 | 5/2009 | Kodama et al. |
| 2015/0169675 | A1 | 6/2015 | Said et al. |

*Primary Examiner* — Robert W Beausoliel, Jr.
*Assistant Examiner* — Pedro J Santos
(74) *Attorney, Agent, or Firm* — Ansari Katiraei LLP; Arman Katiraei; Sadiq Ansari

(57) ABSTRACT

A hybrid file system provides access to files based on metadata-defined paths, user-defined paths, and/or hybrid metadata-defined paths. A metadata-defined path may be defined based on file metadata, and may provide access to files that are tagged with the same metadata that is used to specify the metadata-defined path. Some of the same files may be alternatively accessed using user-defined paths that provide access to the directories where the files are stored. Some of the same files may be alternatively accessed using a hybrid metadata-user-defined path that appends a directory structure to the metadata-defined path in order to provide direct access to a subset of files from the metadata-defined path that are placed into the metadata-user-defined path without accessing other files from the metadata-defined path.

19 Claims, 11 Drawing Sheets

HYBRID METADATA AND FOLDER BASED FILE ACCESS

CLAIM OF BENEFIT TO RELATED APPLICATIONS

This application is a continuation of the U.S. non-provisional application Ser. No. 16/503,926, entitled "Hybrid Metadata and Folder Based File Access", filed Jul. 5, 2019.

BACKGROUND INFORMATION

A file system may manage file storage and file access for one or more computer systems and/or other electronic devices. Specifically, the file system may provide users with access to different files that are stored to different storage devices managed by that file system, and may further allow the users to store files onto the storage devices.

A traditional file system may use directories and subdirectories to organize the files on the one or more storage devices. For instance, a tree-based directory hierarchy may be created to separate the storage of different files or groups of files. The directories may be defined by users and by applications or programs that are installed or run from a user device.

Each file may be stored in a particular directory that is accessed via a particular path. The particular path may specify a traversal of the directory structure from a root directory or root node to the particular directory where the desired file is stored. The particular path may specify each of the subdirectories that lead from the root directory to the particular directory. Accordingly, different users that wish to access the same file may specify the particular directory path where that file is stored, and may access the file from the same directory as there is a one file-to-one directory correspondence.

This one-to-one correspondence may be inefficient or difficult to remember (for users attempting to access files) when some files are simultaneously used as part of different projects or workflows, but those same files have to be accessed from one folder or directory. For instance, a first user working on a first workflow may look for a particular file in a first location, that is associated with the first workflow, and a second user working on a second workflow may look for the same particular file in a second location, that is associated with the second workflow, leading to at least one of the users having difficulty accessing the particular file when the particular file is stored in a directory path that is unrelated to the workflow being performed by the user.

The particular file can be replicated in different directories that are associated with each of the different workflows, but this can lead to multiple copies of the file that are out of sync with one another and/or retain a subset of the data of another copy of the same file. In other words, the changes that are made to one copy of the particular file may not be carried over into the other copy of the particular file that is stored in another directory associated with the other workflow.

DETAILED DESCRIPTION OF PREFERRED EMBODIMENTS

Figure 1:
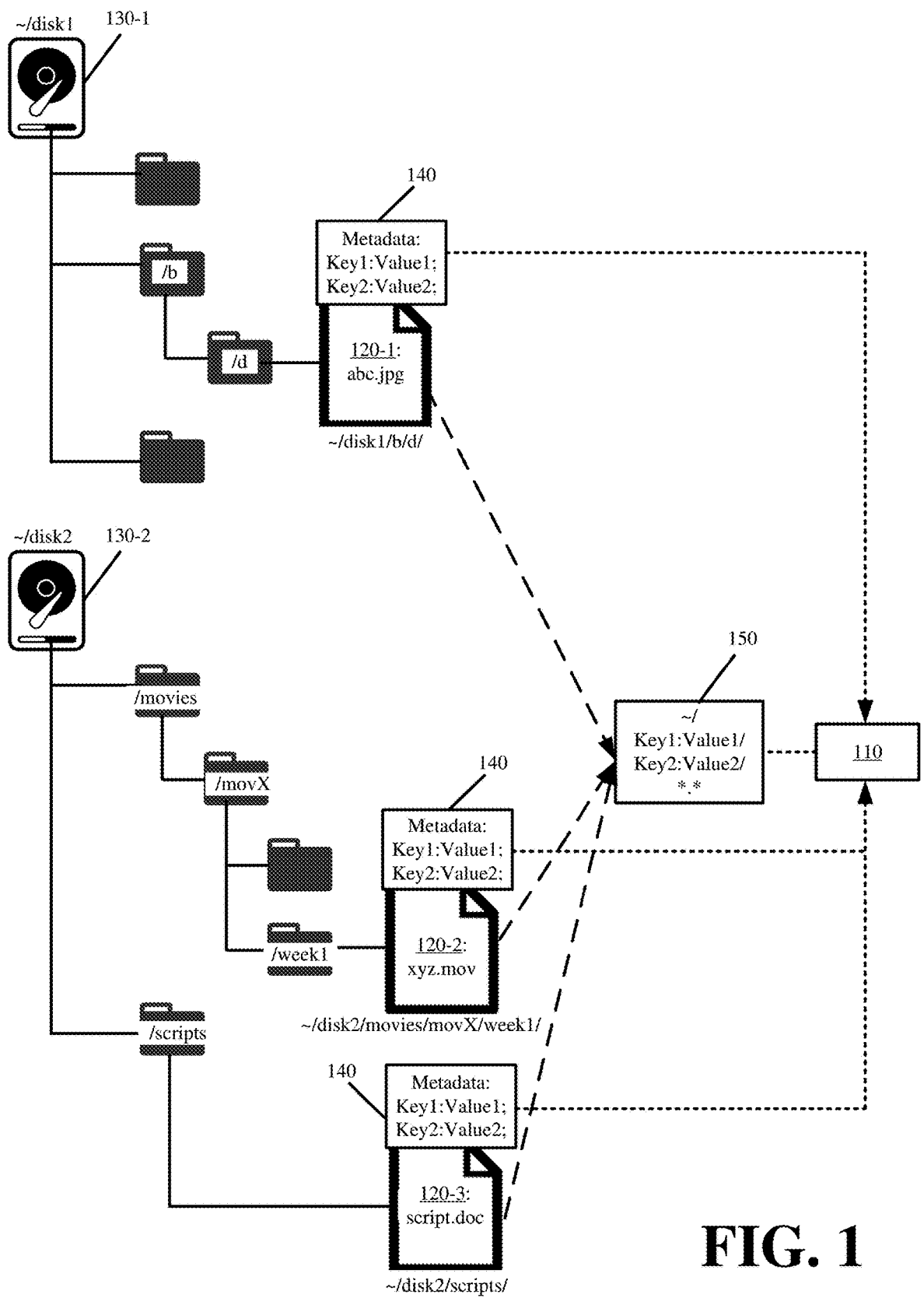
FIG. 1 presents an example of a hybrid file system providing metadata-defined paths for organizing files based on their respective file metadata in accordance with some embodiments presented herein.

The following detailed description refers to the accompanying drawings. The same reference numbers in different drawings may identify the same or similar elements.

Embodiments as described herein provide a hybrid file system that uses file metadata with or without user-created directories to generate different paths by which different users may access the same files. For instance, the hybrid file system may initially organize files to metadata-defined paths that are formed based on key-value pairs from the file metadata. Users may then customize the metadata-based organization of the files by defining hybrid metadata-user-defined paths. A metadata-user-defined path may include one or more user-defined directories that are added to a metadata-defined path, may include one or more files from the parent metadata-defined path (e.g., files with the same or different metadata key-value pairs) or other metadata-defined paths, and may therefore provide alternative means of accessing a subset of files from the parent metadata-defined path without affecting the ability to access each file from the subset of files from their respective metadata-defined path. In some embodiments, user-defined paths may be defined independent of a metadata-defined path to provide a first means, via the user-defined path, to access files according to a user-based organization of the files, and a second means, via the metadata-defined path, to access the same files according to a metadata-based organization of the files. Accordingly, the hybrid file system may manage file access and file storage based on metadata-defined paths that can be appended or otherwise modified with user-defined directory paths, and/or based on user-defined paths that are accessible from or independent of the metadata-defined paths.

The hybrid file system, via the hybrid metadata-user-defined paths, metadata-defined paths, and the user-defined directory paths, may allow different users the ability to specify two or more different paths or access identifiers with which to access the same files. For instance, the same file that is used as part of different projects or workflows can be accessed via different meaningful and/or customized paths that are related to the different projects or workflows, rather than a single path that is tied to the exact location where the file is stored.

Accordingly, the hybrid file system deviates from the traditional one file-to-one directory storage paradigm by providing a one-to-many storage paradigm. The one-to-many storage paradigm allows users the ability to customize file access paths based on the projects or workflows that each user or a group of users works on and/or other storage customizations specified by each user or different groups of users.

In some embodiments, the metadata-based organization of files performed by the hybrid file system and the resulting metadata-defined paths may organize files with the same metadata key-value pairs to a common access path or location. The common access path or location may identify files of a common project or workflow when the taxonomy, from which the metadata is defined, represents different projects, workflows, or other desired groupings of files. In some embodiments, the hybrid file system may provide access to a single file from different metadata-defined paths when that file has metadata key-value pairs that correspond to two or more metadata-defined paths within two or more taxonomies used by the hybrid file system to organize files. In some embodiments, the hybrid file system may provide access to a single file from different metadata-defined paths when that file has metadata key-value pairs that correspond to two or more metadata-defined paths, and each metadata-defined path includes key-value pairs resulting in a different traversal of the same taxonomy.

In some embodiments, the hybrid file system's metadata-based organization of files may be a logical organization when the files are physically stored on different storage devices or in different directories. In some other embodiments, the metadata-based organization of files may correspond to the actual storage location of files on one or more storage devices. In any case, the hybrid file system may provide a particular metadata-defined path to access the different files with the same metadata key-value pairs whether those files are physically stored in the same or different locations (e.g., storage device or directories).

The file metadata may include data that is separate from the file contents. For instance, the file metadata may be stored in the file header, or may be embedded elsewhere in the file (separate from the file contents).

In some embodiments, the file metadata may be stored separate from the file. For instance, the metadata for a particular file may be stored in a metadata database or a separate metadata file that can be queried using the particular file name, the particular file checksum, or other identifier associated with the particular file.

The file metadata may provide descriptive information about the file or file contents, status of the file, properties of the file (e.g., access permissions, size, type, etc.), file relationships (e.g., associated projects and/or workflows), and/or other characteristics related to the file and/or usage of the file. The file metadata can include any arbitrary set of data, although the hybrid file system may be configured with one or more taxonomies that define specific key-value pair metadata hierarchies that the hybrid file system recognizes and uses for the metadata-based organization of files in accordance with some embodiments presented herein.

FIG. 1 presents an example of hybrid file system 110 providing metadata-defined paths for organizing files 120 based on their respective file metadata in accordance with some embodiments presented herein. FIG. 1 illustrates three different files 120-1, 120-2, and 120-3 (herein sometimes collectively referred to as "files 120" or individually as "file 120") stored in different directories on different storage devices 130-1 and 130-2 (herein sometimes collectively referred to as "storage devices 130" or individually as "storage device 130").

In a traditional directory-based file system, each of the files 120 would be accessed from different storage locations via traversals of the directory paths to the different folders containing each file 120. However, hybrid file system 110 may provide an alternative organization of files 120 based on the file metadata.

As shown in FIG. 1, each file 120 has metadata 140 that contains at least two of the same key-value pairs. Hybrid file system 110 may store and/or provide access to files 120 via the same metadata-defined path 150. Metadata-defined path 150 may be specified using the common key-value pairs in the metadata of files 120. Accordingly, a user may access each of files 120-1, 120-2, and 120-3 via the same metadata-defined path 150 without having to issue separate requests or having to navigate to the different storage devices 130 and/or directories where each of files 120 is stored.

In some embodiments, the metadata-based organization depicted in FIG. 1 may be a logical organization of a different physical organization of files 120 on different storage devices 130. In some other embodiments, the metadata-based organization depicted in FIG. 1 may be a physical reorganization of files 120 from the different directories on storage devices 130 to a common storage location or common path on one or more of storage devices 130.

As noted above, the file metadata, that may be used by hybrid file system 110 to provide the metadata-based file access and storage, may be defined by one or more taxonomies. Each taxonomy may specify a hierarchical list of nodes, and each taxonomy node may correspond to a metadata key-value pair that is recognized and used by hybrid file system 110 for the metadata-based organization of files. Accordingly, each taxonomy node may correspond to different supported state, status, condition, parameter, characteristic, and/or other data of a file, organization, or entity associated with the file.

In some embodiments, each hierarchical tier of a taxonomy corresponds to a different metadata key, and the nodes in that tier enumerate the different values that can be assigned to that metadata key. Each key can have one or more different values. Each defined key-value pair, represented by a taxonomy node, may link to one or more other key-value pairs or taxonomy nodes. The taxonomy may be of arbitrary length and can include any arbitrary keys and/or values. The taxonomy need not enumerate all possible key-value pairs that can be included in the file metadata.

In some embodiments, a taxonomy may correspond to a particular project or workflow of an organization, and the taxonomy keys may be used to track progression of a file through different stages of that particular project or workflow. For example, the different stages may correspond to different status that can be assigned to a file as the file progresses through the workflow. Continuing with the example, the taxonomy may include a key with a first value that can be used to define a first status for an unverified file, and a second value that can be used to define a different second status for a verified file. Other examples of taxonomy keys that can be used to define different stages in a workflow may include a key with a first value for an unapproved state of a file, and a second value for an approved state of the file; a key with a first value to identify an unedited file, and a second value to identify an edited file; a key with a first value to identify a confidential file, and a second value to identify a non-confidential file; and a key with a first value to restrict file access to a first set of users, and a second value to restrict file access to a different second set of users. These examples are provided for illustrative purposes, and do not limit the different keys that can be used to define different taxonomies used by hybrid file system 110.

When a file is provided to hybrid file system 110 for storage, hybrid file system 110 may store the file, and may provide access to that file according to a correspondence between the file metadata and one or more of the configured taxonomies. For instance, each leaf node and/or each node of a taxonomy may be associated with a particular metadata-defined path or metadata-defined storage location, wherein the particular metadata-defined path may be defined based on the key-value pairs that lead to that taxonomy node.

In some embodiments, hybrid file system 110 may automatically define and/or update the file metadata by analyzing the file, and/or by monitoring interactions with the file. For instance, when a user changes the status of a file from an unapproved state to an approved state, hybrid file system 110 may detect the change, may detect that the change impacts a particular key defined in the taxonomy, and may update the value for that particular key in the file metadata. In some other embodiments, users, applications, or other third-party systems may modify the file metadata before returning the file to hybrid file system 110 for storage.

In some embodiments, hybrid file system 110 may automatically define and/or update the file metadata based on a metadata-defined path specified for accessing or storing the file. For instance, hybrid file system 110 may automatically populate the metadata of a file with key-value pairs that are associated with a metadata-defined path where the file is to be stored.

In some embodiments, the taxonomy keys may, additionally or alternatively, be defined according to properties of the files. For instance, one or more of the taxonomy keys can be defined based on the size of a file, the file type, the last modified timestamp, the file encoding, the file resolution, other file attributes, file characteristics, and/or other file properties. Here again, hybrid file system 110 may automatically define and/or update the file metadata for different files by monitoring the file properties, detecting which file properties correspond to keys in the taxonomy and updating the value for those keys in the file metadata.

In some embodiments, the user uploading a file to a storage device via hybrid file system 110 may be presented with a programmatic or graphical interface by which to tag the file with key-value pairs from one or more configured taxonomies. For instance, hybrid file system 110 may detect that an uploaded file lacks metadata key-value pairs from a configured taxonomy and/or is a new file that was not previously stored on a storage device under control of hybrid file system 110. Accordingly, hybrid file system 110 may present the user, via a programmatic or graphical interface, a first or topmost key of a taxonomy, receive input that defines a value for that first key, and then present a next second key that is linked to the defined key-value pair for the first key. Hybrid file system 110 may continue through the taxonomy until the file is tagged with a sufficient number of key-value pairs by which hybrid file system 110 may organize the file according to the tagged metadata key-value pairs.

Figure 2:
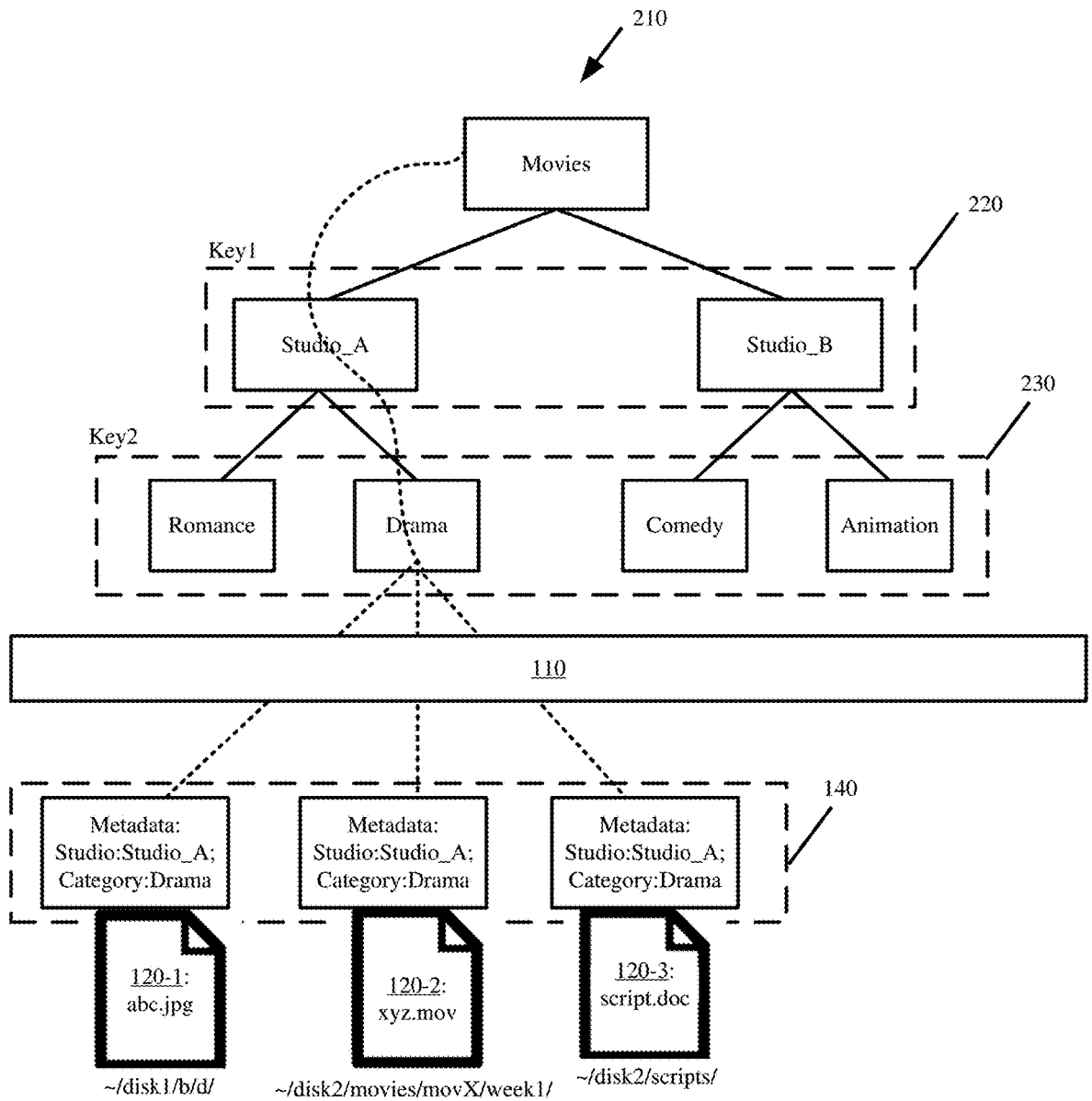
FIG. 2 conceptually illustrates an example taxonomy, that can be used to define the key-value pairs for file metadata of files, and that can also be used by the hybrid file system for the metadata-based file organization in accordance with some embodiments presented herein.

FIG. 2 conceptually illustrates example taxonomy 210, that can be used to define the key-value pairs for metadata 140 of files 120-1, 120-2, and 120-3, and that can also be used by hybrid file system 110 for the metadata-based file organization in accordance with some embodiments presented herein. Taxonomy 210 may include a root node that specifies a workflow, project, or other metadata-based classification for files. Taxonomy 210 may include first key 220 that includes two different values for specifying a first metadata key-value pair (e.g., a movie studio), and second key 230 with different sets of values for specifying a second metadata key-value pair (e.g., movie type). The second sets of values that may be selected for a particular file may change based on the value that is used to define first key 220 for that particular file.

In FIG. 2, files 120 have the same metadata key-value pairs (e.g., "studio=Studio_A" and "category=Drama"), and can therefore be accessed via the same metadata-defined path. Each of the files may alternatively be accessed from another metadata-defined path if the file has additional metadata key-value pairs that correspond to a different traversal of taxonomy 210. For instance, if file 120-1 also included metadata key-value pair "category=Romance" in addition to key-value pairs "studio=Studio_A" and "category=Drama", then hybrid file system 110 would provide access to file 120-1 via any one of two example metadata-defined paths "~/studio:Studio_A/category=Romancer/" and ""~/studio:Studio_A/category=Drama". In other words, the same instance of file 120-1 could be accessed using different paths because the metadata of file 120-1 matches two different traversals of taxonomy 210.

In some embodiments, hybrid file system 110 allows users the ability to customize the metadata-based organization of files by creating user-defined directories that extend the metadata-defined paths or that are independent of the metadata-defined paths. Users may move different files into the hybrid metadata-user-defined paths or user-defined directories. In response, hybrid file system 110 may generate alternative paths for accessing the same files, although the different paths may have groupings of different files.

Hybrid file system 110 may generate a hybrid metadata-user-defined path when a user-defined directory structure is appended off a particular metadata-defined path, and may generate a user-defined path when a user-defined directory structure is created independent of a metadata-defined path. The particular metadata-defined path may be used to access a particular file and a first group of files that share the same metadata key-value pairs as the particular file, while each of the hybrid metadata-user-defined paths or user-defined paths may access the particular file with a different second group of files that are placed into that path. In some embodiments, the group of files placed in a hybrid metadata-user-defined path or a user-defined path may include a subset of files from the particular metadata-defined path, or may include a custom user-selected set of files from different metadata-defined paths. Accordingly, hybrid file system 110 supports accessing and/or storing the same particular file via a particular metadata-defined path, one or more hybrid metadata-user-defined paths, and/or one or more user-defined paths.

The hybrid metadata-user-defined and/or user-defined paths can be used to enhance the depth and customize the organization of files. For instance, the metadata-based organization may be based on a taxonomy that has a limited depth (e.g., a linked list of three of fewer keys), and users may want to customize the organization of files beyond the taxonomy provided depth. With reference to taxonomy 210 of FIG. 2, users may want to create directories or subfolders off a particular second key 230 to better organize files 120. Specifically, users may create directories to separate script related files (e.g., file 120-3) from movie related files (e.g., file 120-2) from image related files (e.g., file 120-1) for a project having files with "studio_A" and "drama" metadata tags.

In some embodiments, the hybrid metadata-user-defined paths can be defined off any node of a taxonomy. For instance, with reference to FIG. 2, a metadata-user-defined path can be created and linked off a node corresponding to any key of first set of keys 220 or second set of keys 230.

Other benefits of enhancing the metadata-based organization of files with hybrid metadata-user-defined paths and/or user-defined paths include the ability to share a subset of files from the metadata-based organization without losing the organizational structure of the files, and/or providing different users customized paths for accessing different subsets of files that are organized to the same metadata-defined path. For instance, a metadata-defined path may provide access to ten files that have the same metadata key-value pairs as a result of being part of the same workflow. A first user may only work on six of the ten files, and a second user may only work on the other four of the ten files. Rather than present all ten files to the first user and the second user, each user may create a user-defined directory off the metadata-defined path, and may insert the files that they will work on in those directories to expedite and simplify file access without changing the metadata-defined path that these and/or other users can use to access the ten files of the same workflow because of the common key-value pairs in the metadata of the files.

Figure 3:
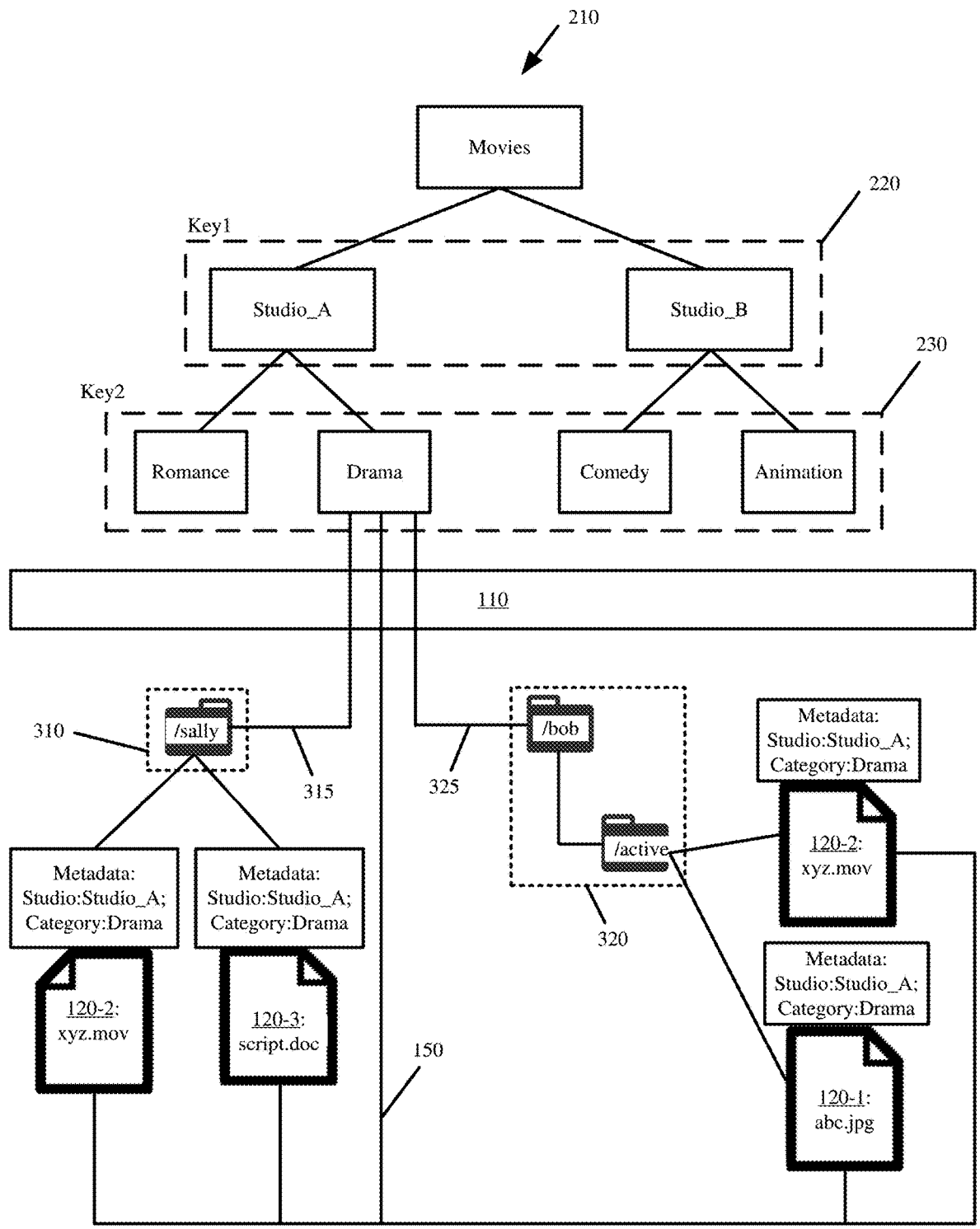
FIG. 3 illustrates an example of the hybrid file system generating hybrid metadata-user-defined paths as alternatives to a metadata-defined path in accordance with some embodiments presented herein.

FIG. 3 illustrates an example of hybrid file system 110 generating hybrid metadata-user-defined paths 315 and 325 as alternatives to metadata-defined path 150 for accessing files 120 in accordance with some embodiments presented herein. As shown, hybrid file system 110 may use taxonomy 210 to organize files 120-1, 120-2, and 120-3 to common metadata-defined path 150 based on the same key-value pairs found in the metadata of files 120. Hybrid file system 110 may also provide alternative access to different groupings of files 120 based on user-defined directories 310 and 320.

For instance, a first user may access files 120-2 and 120-3, and may want a custom user-defined path to quickly and easily access files 120-2 and 120-3 without accessing other files (e.g., file 120-1) in metadata-defined path 150. Accordingly, the first user may create directory 310 off metadata-defined path 150. The first user may select files 120-2 and 120-3 to place into directory 310, and hybrid file system 110 may generate first hybrid metadata-user-defined path 315 that provides direct access to files 120-2 and 120-3 while excluding file 120-1. For instance, the first user may use example metadata-user-defined path of "~/studio_a/drama/sally/" to access files 120-2 and 120-3 placed in directory 310. In some embodiments, first hybrid metadata-user-defined path 315 may specify the keys and values for the metadata-defined portion of the hybrid path (e.g., "~/key1:studio_a/key2:drama/sally/"). In some embodiments, the first user may use example access path "~/sally/" corresponding to the name of directory 310 to access files 120-2 and 120-3 in directory 310, and hybrid file system 110 may convert the example access path "~/sally/" to first hybrid metadata-user-defined path 315.

In some embodiments, hybrid file system 110 may define access permissions for first hybrid metadata-user-defined path 315 such that first hybrid metadata-user-defined path 315 may be used by the first user, all users, or a specific subset of users with permission to access directory 310. Accordingly, hybrid file system 110 may hide directory 310 from a second user, or may prevent the second user from accessing first hybrid metadata-user-defined path 315, when the second user does not have access permissions to directory 310. The second user may still access files 120-2 and 120-3 (and also file 120-1) using original metadata-defined path 150 (e.g., "~/key1:studio_A/key2:drama/" or "~/studio_A/drama/") provided that the second user has permissions to access metadata-defined path 150.

As also shown in FIG. 3, hybrid file system 110 may generate second hybrid metadata-user-defined path 325 for directly accessing files 120-1 and 120-2 (while excluding file 120-3). For instance, the second user may create a different directory structure 320, append directory structure 320 to metadata-defined path 150, and place files 120-1 and 120-2 into directory structure 320. In response, hybrid file system 110 may generate second hybrid metadata-user-defined path 325 based on metadata-defined path 150 and directory structure 320, wherein second hybrid metadata-user-defined path 325 becomes an alternative path to metadata-defined path 150 for accessing files 120-1 and 120-2.

In some embodiments, second hybrid metadata-user-defined path 325 may be specified to include the metadata key-value pairs of metadata-defined path 150 and the directory path of directory structure 320. For instance, second hybrid metadata-user-defined path 325 may be specified as "~/studio_a/drama/bob/active" or "~/key1:studio_a/key2:drama/bob/active/". In some embodiments, second hybrid metadata-user-defined path 325 may be specified as "~/bob/active/", and hybrid file system 110 may convert and/or expand the path to include the key-value pairs of metadata-defined path 150.

Here again, some users may or may not have access to files 120-1 and 120-2 in directory structure 320, although they may still access all files 120 using original metadata-defined path 150, provided they have access to original metadata-defined path 150. In other words, hybrid file system 110 may restrict some users from using second hybrid metadata-user-defined path 325 to access files 120-1 and 120-2, although those same users may use metadata-defined path 150 as an alternative means of accessing files 120-1 and 120-2 with a different grouping that also includes file 120-3.

In some embodiments, directory structure 320 could be moved or defined off the key-value pair "key1:Studio_B" to create a different metadata-user-defined path for accessing the same or different subsets of files. In some such embodiments, hybrid file system 110 may add the key-value pair "key1:Studio_B" to the metadata of files placed into the metadata-user-defined path.

Figure 4:
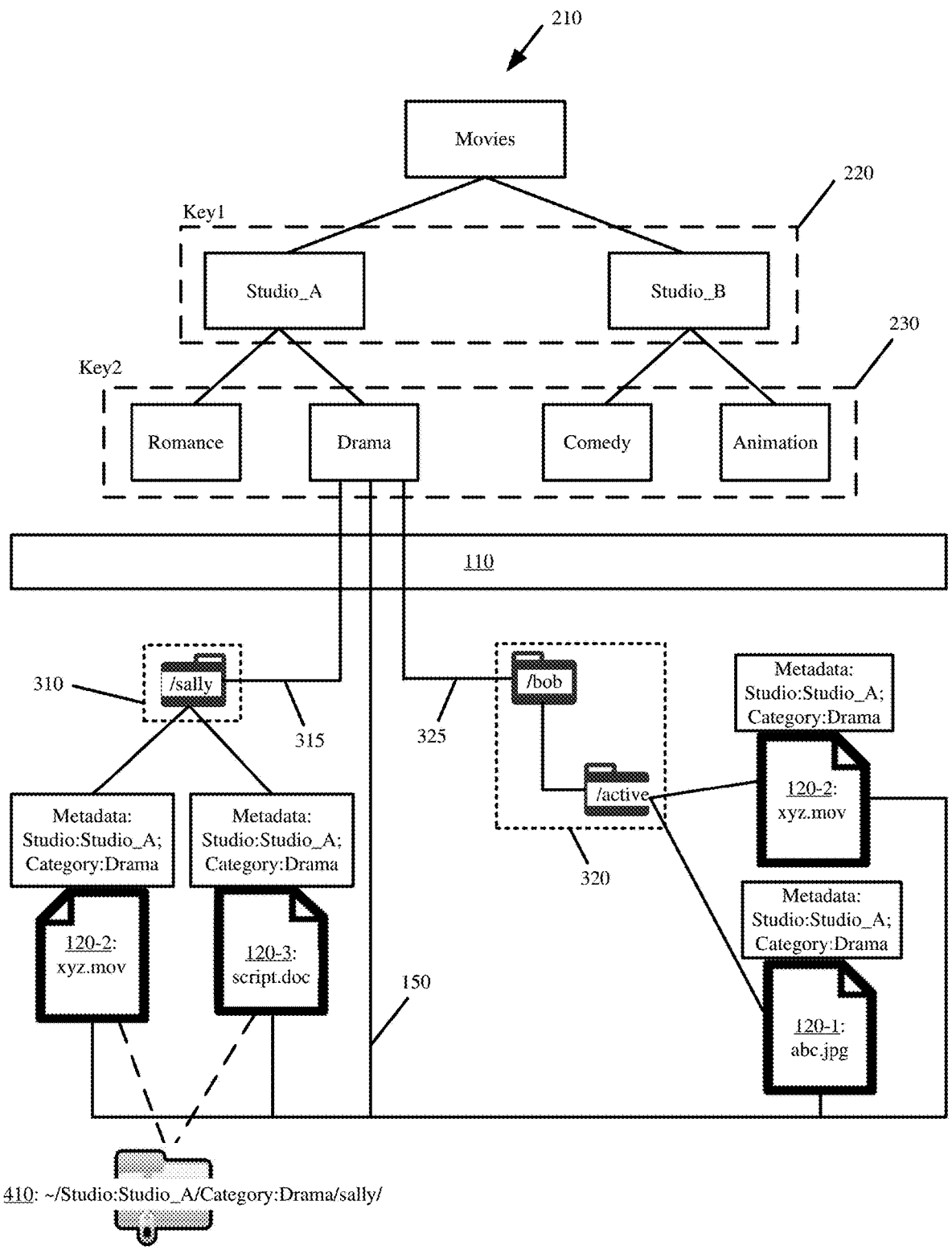
FIG. 4 illustrates an example of sharing different subsets of files within a metadata-defined path via hybrid metadata-user-defined paths in accordance with some embodiments presented herein.

The hybrid metadata-user-defined paths simplify the sharing of different subsets of files organized to a particular metadata-defined path without disrupting the metadata-based organization of the files. FIG. 4 illustrates an example of sharing different subsets of files 120 within metadata-defined path 150 via hybrid metadata-user-defined paths 315 and 325 in accordance with some embodiments presented herein.

As shown in FIG. 4, a first user may share only files 120-2 and 120-3 (and exclude file 120-1) with other users without losing the organizational structure of files 120-2 and 120-3 by providing the other users with a compressed file/directory 410 that is generated from first hybrid metadata-user-defined 315, or by providing the other users with access to first hybrid metadata-user-defined path 315. The other users can use file/directory 410 or first hybrid metadata-user-defined 315 to directly access files 120-2 and 120-3, and/or modify files 120-2 and 120-3. File/directory 410 and/or first hybrid metadata-user-defined path 315 merely customize the presentation of files from original metadata-defined path 150 to exclude file 120-1.

In some embodiments, hybrid file system 110 does not replicate a file or create multiple instances of a file in response to creation of hybrid metadata-user-defined paths 315 and 325, and placement of the same file (e.g., file 120-2) into different paths 315 and 325. In some embodiments, hybrid file system 110 associates pointers or links to files 120 that are placed in different hybrid metadata-user-defined paths 315 and 325 or user-defined paths, or that are otherwise associated with different hybrid metadata-user-defined paths 315 and 325 or user-defined paths. For instance, hybrid file system 110 may specify a first pointer that links a stored copy of file 120-2 to metadata-defined path 150, a second pointer that links the stored copy of file 120-2 to first hybrid metadata-user-defined path 315, and a third pointer that links the stored copy of file 120-2 to hybrid metadata-user-defined path 325 such that whichever path is used to access file 120-2, the same instance of file 120-2 is accessed. The pointers and links ensure file consistency and file deduplication despite hybrid file system 110 providing different paths to access the same file. If file 120-2 is modified as a result of access made using first hybrid metadata-user-defined path 315, modified file 120-2 may be accessed by other users using first hybrid metadata-user-defined 315, original metadata-defined path 150, or other hybrid metadata-user-defined paths or user-defined paths to directory structure 310.

Hybrid file system 110 may manage the addition and removal of files to the various accessible paths. For instance, if a user adds a new file, that lacks metadata, to first hybrid metadata-user-defined path 315, hybrid file system 110 may automatically tag the new file with key-value pairs from parent metadata-defined path 150 (e.g., "~/key1:studio_a/key2:drama/"). Consequently, the new file becomes accessible via either first hybrid metadata-user-defined path 315 or metadata-defined path 150. If the new file already includes metadata key-value pairs from a configured taxonomy, hybrid file system 110 may make the new file accessible from first hybrid metadata-user-defined path 315 and whichever metadata-defined path corresponds to the metadata key-value pairs of the new file. If a user deletes file 120-2 using first hybrid metadata-user-defined path 315, hybrid file system 110 may remove the actual copy of file 120-2 from storage, and may also remove any pointers that link file 120-2 to other access paths. For example, in response to a command to delete file 120-2 from first hybrid metadata-user-defined path 315, hybrid file system 110 may also remove file 120-2, or the pointers to file 120-2, from metadata-defined path 150 and second hybrid metadata-user-defined path 325, thereby preventing access to file 120-2 from any previously defined access path.

If the metadata of a file changes over time or based on different user access, hybrid file system 110 may detect the changes, and may update the metadata-defined path of the file. Hybrid file system 110 may also update or modify metadata-user-defined paths and/or user-defined paths that are based on the modified metadata-defined path.

Figure 5:
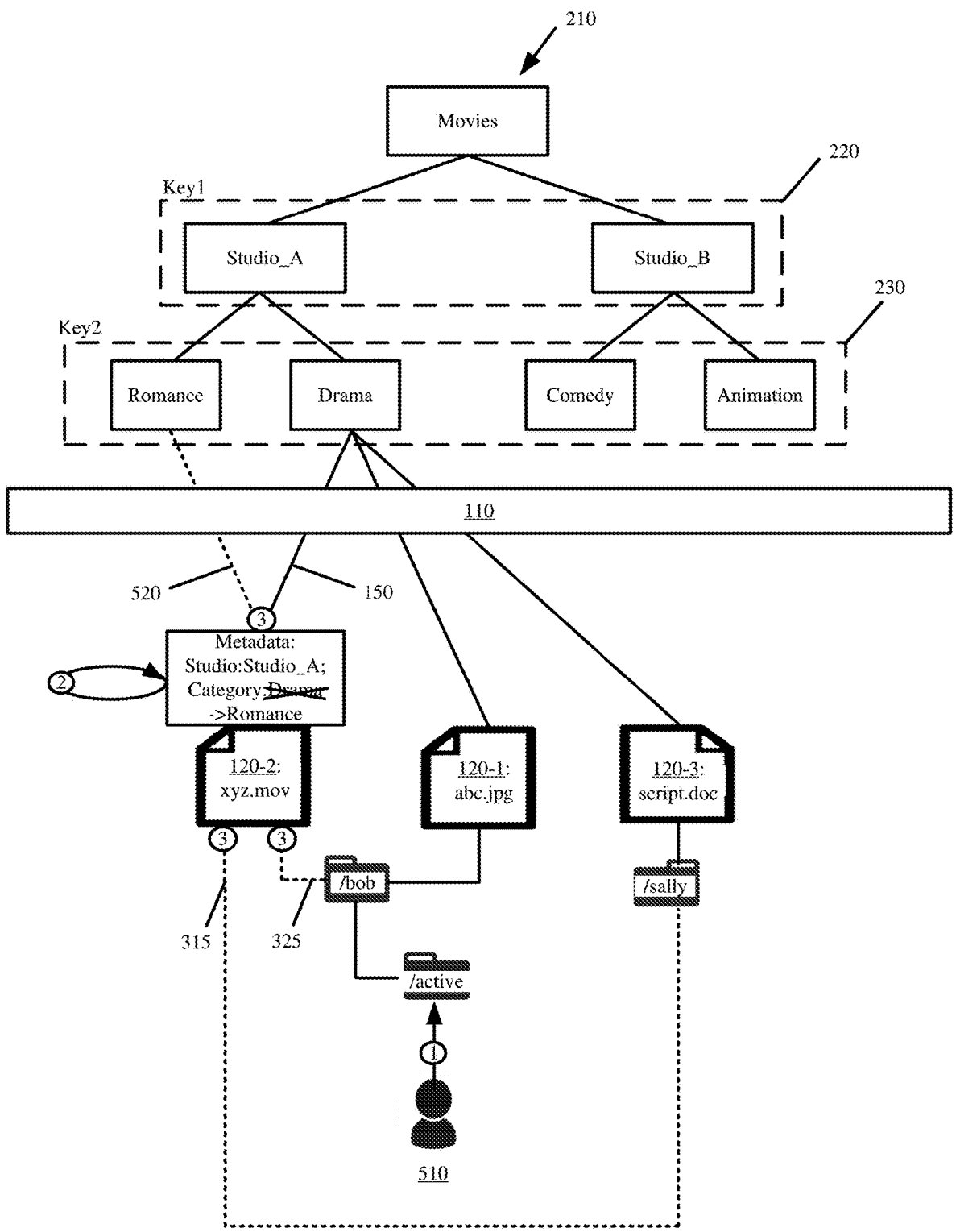
FIG. 5 presents an example of the hybrid file system reorganizing a file in response to a detected change in the metadata of the file.

FIG. 5 presents an example of hybrid file system 110 reorganizing file 120-2 in response to a detected change in the metadata of file 120-2. As shown in FIG. 5, user 510 may access (at 1) file 120-2 using second hybrid metadata-user-defined path 325. Hybrid file system 110 may receive the access request, and may provide file 120-2 in response to the request.

User 510 may modify the metadata of file 120-2. The file metadata change may occur independent of any changes to the contents of file 120-2, or may occur as a result of changing the contents of file 120-2. For instance, the file metadata change may occur as file 120-2 progresses from a first state to a second state of a particular workflow (e.g., from an unverified state to a verified state), or as a result of reclassification of file 120-2.

In any case, hybrid file system 110 may detect (at 2) the file metadata change. Hybrid file system 110 may detect (at 2) the file metadata change when user 510 finishes accessing file 120-2, and commits file 120-2 back into storage. In some such embodiments, hybrid file system 110 may compare the metadata of returned file 120-2 to the metadata of a stored copy of file 120-2 in order to detect (at 2) that the metadata has changed. In some embodiments, hybrid file system 110 may detect (at 2) the file metadata change as user 510 interacts with file 120-2, and/or progresses through a workflow that uses file 120-2.

In response to detecting (at 2) the metadata change, hybrid file system 110 may compare the metadata of file 120-2 to keys of taxonomy 210, and may determine that the metadata-defined path for file 120-2 has changed. In particular, hybrid file system 110 may determine that the changed file metadata traverses through a different path and leads to a different node of taxonomy 210. For instance, file 120-2 previously had metadata key-value pairs of "key1:studio_a" and "key2:drama" that defined first metadata-defined path 150 of "~/key1:studio_a/key2:drama/", and file 120-2 now has metadata key-value pairs of "key1: studio_a" and "key2: romance" that define different second metadata-defined path 520 of "~/key1:studio_a/key2:romance/". Accordingly, hybrid file system 110 may update (at 3) the metadata-defined path that is used to access file 120-2 from first metadata-defined path 150 to second metadata-defined path 520. In some embodiments, hybrid file system 110 may also update hybrid metadata-user-defined paths (e.g., metadata-user-defined paths 315 and 325) and/or user-defined paths that file 120-2 was previously included in. For instance, as a result of moving file 120-2 from first metadata-defined path 150 to second metadata-defined path 520, hybrid file system 110 may remove file 120-2 from metadata-user-defined paths 315 and 325 that were based off first metadata-defined path 150. In some embodiments, hybrid file system 110 may generate new metadata-user-defined paths for file 120-2 that resemble paths 315 and 325, but that are based off or linked to second metadata-defined path 520 instead of first metadata-defined path 150. In some embodiments, no updates may be needed for the hybrid metadata-user-defined paths and/or user-defined paths that included file 120-2 since these paths may include a pointer to the actual stored file, and hybrid file system 120 preserves the alternative paths defined for accessing file 120-2.

As noted above, each of the metadata-defined paths, hybrid metadata-user-defined paths, and/or user-defined paths that access at least one particular file may point to or link to a single stored instance of that particular file on a storage device that is managed by and/or controlled by hybrid file system 110. In some embodiments, when the particular file (e.g., file metadata or file contents) changes, hybrid file system 110 may store the changed version of the particular file to a storage location on the storage device, may create one or more paths for accessing the changed version of the particular file, and may retain the previous version of the particular file along with the paths for accessing the previous version. In some other embodiments, when the particular file (e.g., file metadata or file contents) changes, hybrid file system 110 may store the changed version of the particular file to a storage location on the storage device, may update each of the access paths, that were used to access the previous version of the particular file, to access the changed version of the particular file, and may optionally remove the previous stored version of the particular file from the storage device.

In some embodiments, hybrid file system 110 may create a directory structure on a storage device that mirrors a taxonomy structure used by hybrid file system 110 for the metadata-based organization of files. For instance, hybrid file system 110 may create a hierarchical directory structure to mirror the hierarchical organization of key-value pairs from a taxonomy used by hybrid file system 110 to organize files. The metadata-defined paths used to read and write files may then directly map to different directories of the taxonomy-defined directory structure.

In some embodiments, all files managed by hybrid file system 110 may be stored to a common directory, and hybrid file system 110 may differentiate access to different files based on the metadata-defined path that is used to request one or more files. In these and other embodiments, the metadata-defined paths, hybrid metadata-user-defined paths, and/or user-defined paths may correspond to a logical location of one or more files that is different than the actual physical storage of the files. Hybrid file system 110 may convert the logical path to the physical paths to manage file access and file storage.

In some embodiments, hybrid file system 110 may use a database to map the storage location of each file to at least one metadata-defined path, metadata-user-defined path, or user-defined path that users can use to access the file. In other words, hybrid file system 110 may convert a request that is directed to the metadata-defined path of a file to the actual storage location of the file on a storage device. Specifically, a metadata-defined path may link to the files or checksums of stored files that are accessed using that metadata-defined path.

Figure 6:
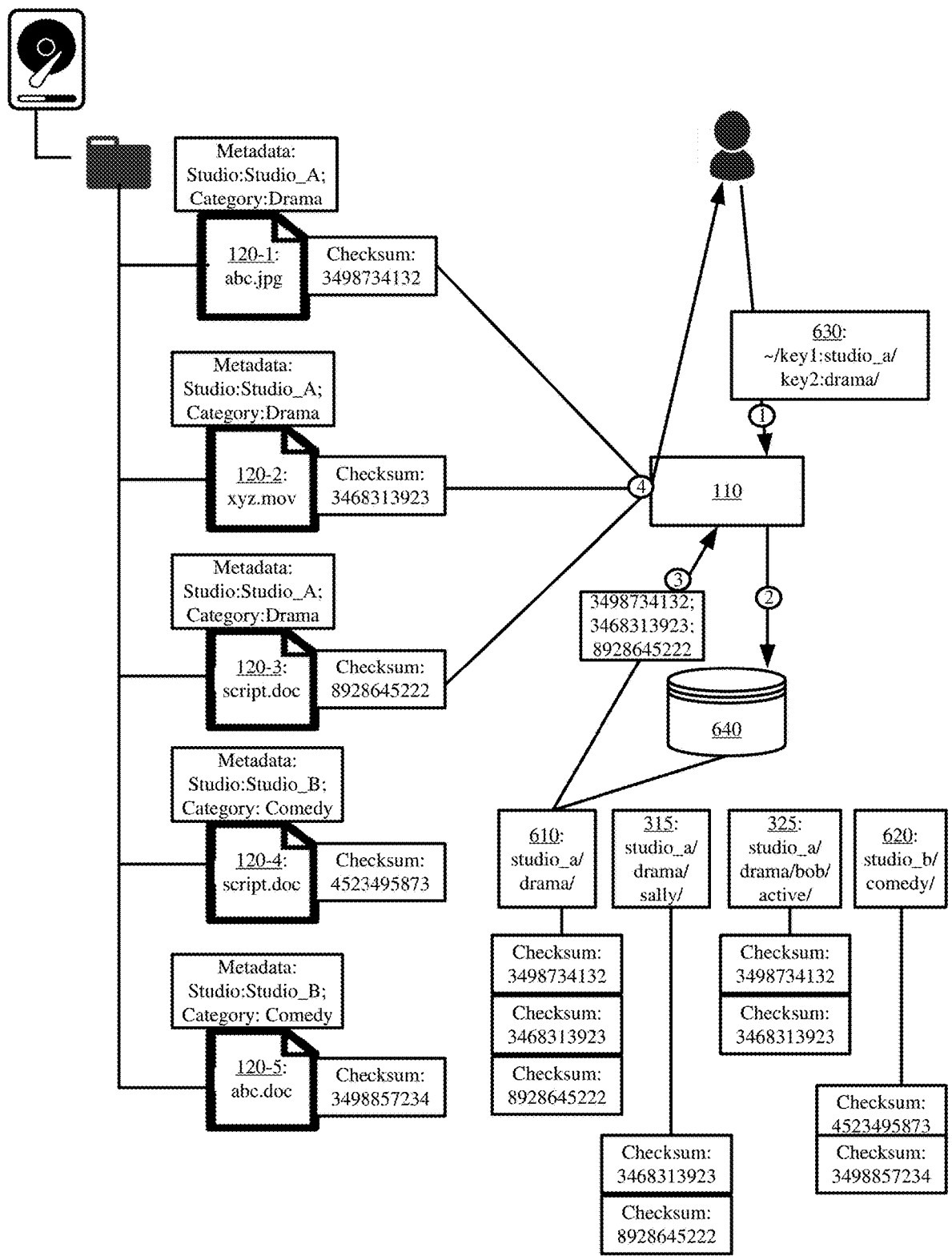
FIG. 6 illustrates an example of the hybrid file system mapping a logical metadata-defined path to the physical storage location of a set of files with metadata key-value pairs that correspond to the metadata-defined path in accordance with some embodiments presented herein.

FIG. 6 illustrates an example of hybrid file system 110 mapping a logical metadata-defined path to the physical storage location of a set of files with metadata key-value pairs that correspond to the metadata-defined path in accordance with some embodiments presented herein. As shown in FIG. 6, files 120-1, 120-2, 120-3, 120-4, 120-5, and/or other files 120 may be physically stored in a root directory of a storage device. FIG. 6 further illustrates accessing a subset of files 120 via logical metadata-defined path 610.

Hybrid file system 110 may receive (at 1) access request 630. Access request 630 may be a request to access or read at least one file from storage. Access request 630 may include an identifier. The identifier may be a Uniform Resource Locator ("URL") or a logical path that points to a particular directory or a particular file in a directory. In this example, access request 630 specifies first metadata-defined path 610.

In response to access request 630, hybrid file system 110 may query (at 2) database 640 with first metadata-defined path 610. Database 640 may store pointers that map each defined metadata-defined path (e.g., paths 610 and 620) or metadata-user-defined path (e.g., paths 315 and 325) to the checksums of the different files that are accessible via each path, and/or to the actual storage location (e.g., directory path) of those files.

In response to the query (at 2), hybrid file system 110 and may obtain (at 3), from database 640, the checksums of files 120-1, 120-2, and 120-3 that have the same key-value pairs and that are accessed using first metadata-defined path 610. Database 640 may also return the root directory or other physical storage location on one or more storage devices where hybrid file system 110 can find the returned file checksums.

Hybrid file system 110 may use the obtained (at 3) checksums of files 120-1, 120-2, and 120-3 to search the root directory where all files 120 are physically stored, and to retrieve copies of files 120-1, 120-2, and 120-3 from the root directory. Accordingly, hybrid file system 110 maps the logical metadata-defined path 610 from access request 630 to the actual storage location of the files that may be accessed via the logical metadata-defined path 610. Hybrid file system 110 may then provide (at 4) the device or user, that submitted access request 630, access to files 120-1, 120-2, and 120-3 based on the checksums linking to the stored copies of files 120-1, 120-2, and 120-3 on the storage device.

In some embodiments, hybrid file system 110 may use other identifiers besides the file checksums to map between the logical access paths and the physical storage location of the files on one or more storage device. For instance, the filename and file type, a file signature, or another file hash may be used to identify files 120 on the storage device and to link to the different logical paths that can be used to access different subsets of files 120.

Figure 7:
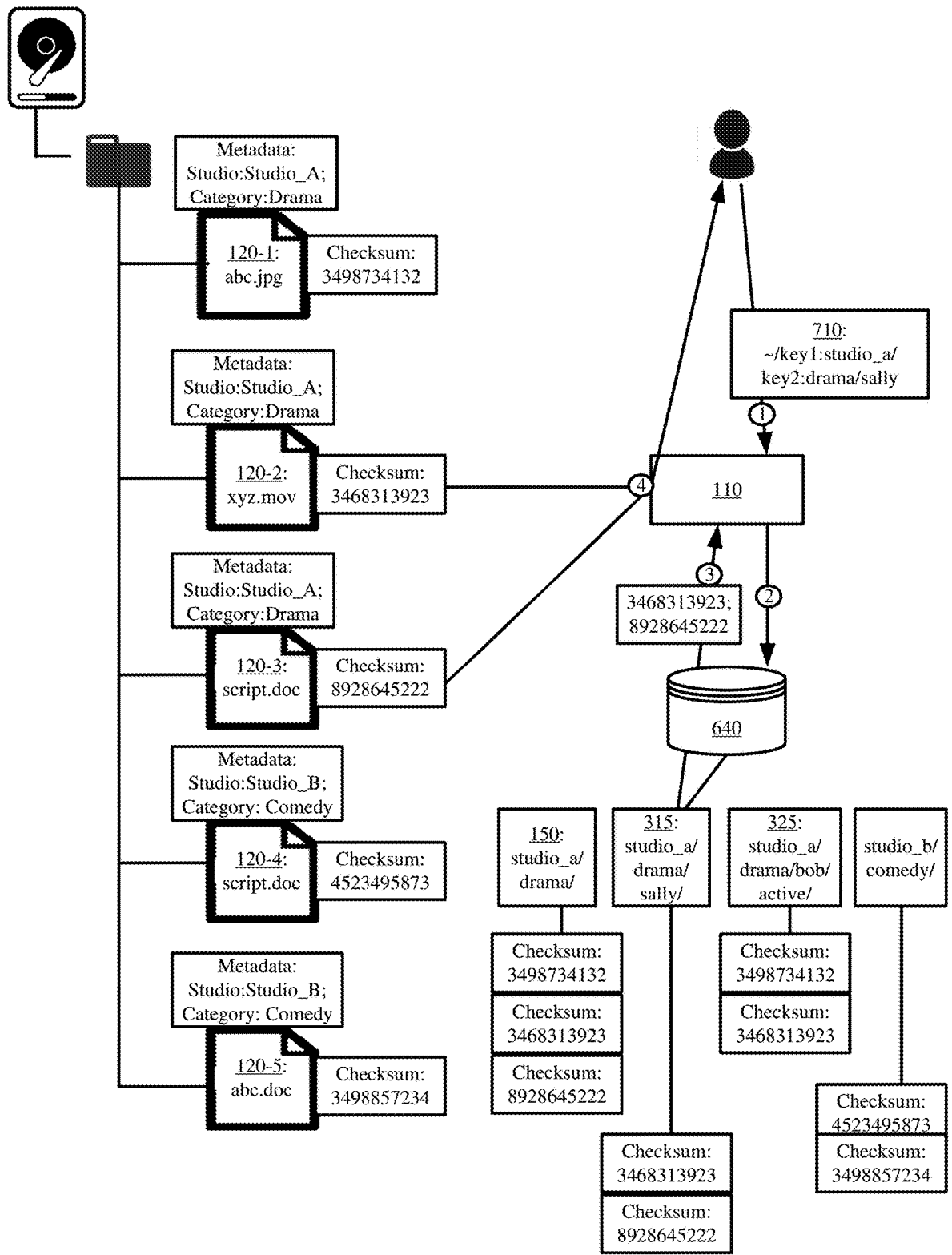
FIG. 7 illustrates an example of the hybrid file system mapping the same one or more files that were accessed in FIG. 6 via a metadata-defined path to a different metadata-user-defined path, and providing access to those files based on an access request specifying the metadata-user-defined path in accordance with some embodiments presented herein.

FIG. 7 illustrates an example of hybrid file system 110 mapping the same one or more files that were accessed in FIG. 6 via a metadata-defined path to a different metadata-user-defined path, and providing access to those files based on an access request specifying the metadata-user-defined path in accordance with some embodiments presented herein. As shown in FIG. 7, hybrid file system 110 may receive (at 1) access request 710 for reading at least one file from storage. In this example, access request 710 specifies first hybrid metadata-user-defined path 315. In particular, access request 740 includes a URL with a first part having different key-value pairs from taxonomy 200, and a second part with user-defined directory structure 310.

Hybrid file system 110 may query (at 2) database 640 using first hybrid metadata-user-defined path 315. Database 640 stores the file checksums that are linked to first hybrid metadata-user-defined path 315 and other paths. In response to the query (at 2), database 640 returns (at 3) checksums for files 120-2 and 120-3, that are linked to first hybrid metadata-user-defined path 315, to hybrid file system 110. Database 640 may also return the root directory or other physical storage location on one or more storage devices where hybrid file system 110 can find the returned file checksums. In other words, database 640 maps the logical path specified by first metadata-user-defined path 315 to the physical storage location of files 120-2 and 120-3.

Hybrid file system 110 may use the checksums to obtain copies of files 120-2 and 120-3. Hybrid file system 110 may then provide (at 4) the device or user, that submitted access request 710, access to files 120-2 and 120-3 based on the checksums linking to the stored copies of files 120-2 and 120-3 on the storage device.

Hybrid file system 110 may manage file access based on user-defined paths that are independent of the metadata-defined paths in a similar way. For instance, each user-defined path may be a logical path to one or more files. For each user-defined path, database 640 may store the file checksums for the files that are accessed using that user-defined path and/or the actual storage location (e.g., directory path) of those files, and may provide the checksums to hybrid file system 110 to provide users access to those files.

In some embodiments, the metadata-defined paths, hybrid metadata-user-defined paths, and/or user-defined paths may be specific to different users. For instance, a user-defined path created by a first user may not be accessed by a second user. In some other embodiments, the hybrid metadata-user-defined paths may be used by a set of users provided that the set of users can access the files that are in the metadata-user-defined paths from the parent metadata-defined path. In some such embodiments, a hybrid metadata-user-defined may inherit the user permissions of the parent metadata-defined path from which it is defined, although the user permissions of the hybrid path may be modified to be different from the metadata-defined path.

In some embodiments, hybrid file system 110 may function as a mounted file system that provides users direct access to stored files. In some other embodiments, hybrid file system 110 may function as a file repository, whereby users may checkout one or more files by downloading copies of those files to a local machine, interact with the downloaded copies of the files, and upload original or modified files back to hybrid file system 110 when the file access is complete.

Figure 8:
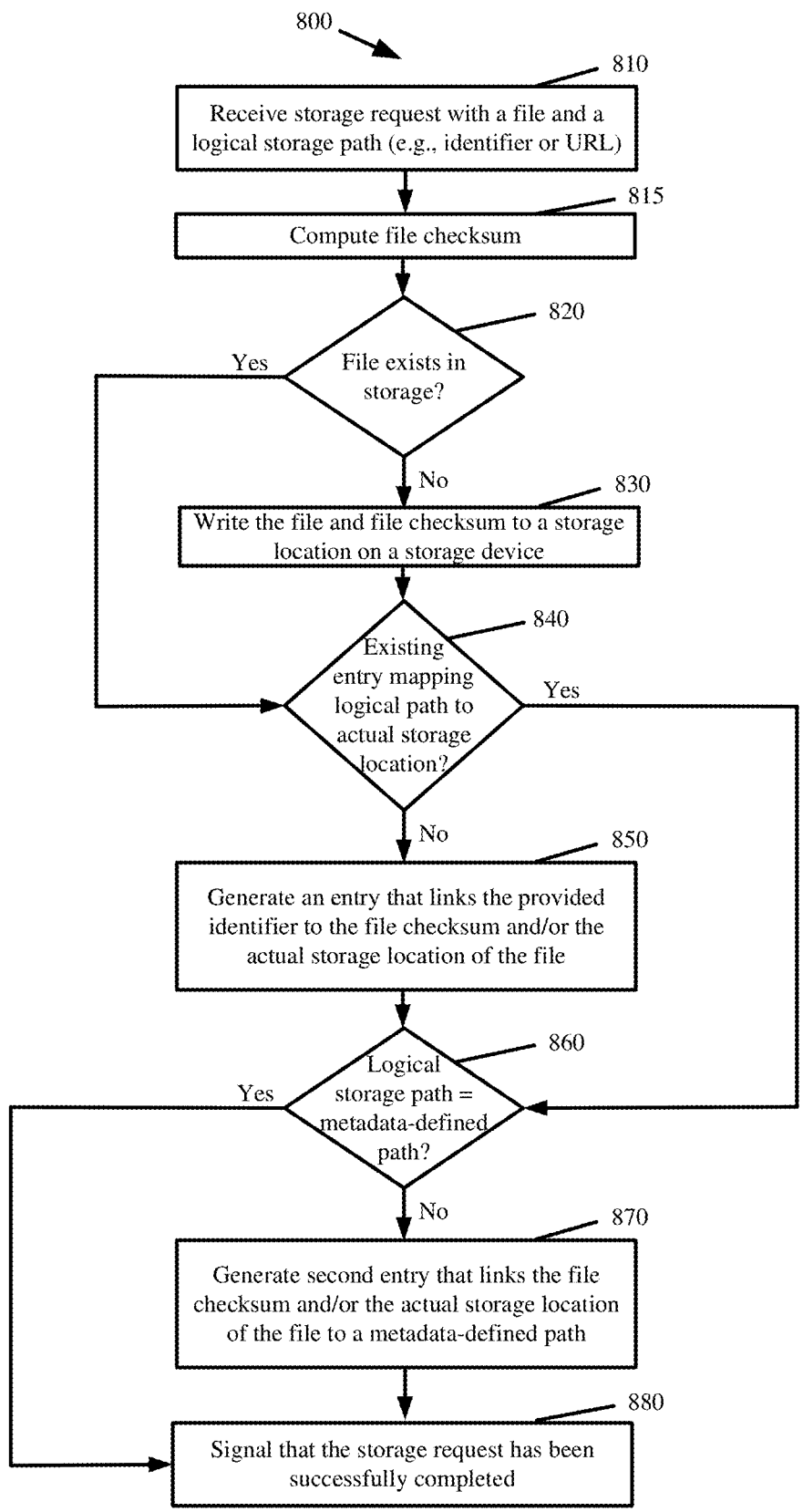
FIG. 8 presents a process for storage operations performed by the hybrid file system in accordance with some embodiments presented herein.

FIG. 8 presents a process 800 for storage operations performed by hybrid file system 110 in accordance with some embodiments presented herein. Process 800 may be implemented by hybrid file system 110, alone or in combination, with database 640 or other databases.

Process 800 may include receiving (at 810) a storage request with a file and an identifier that specifies the logical path (e.g., metadata-defined path, metadata-user-defined path, or user-defined path) for storing and subsequently accessing the file. The identifier may be a URL. The storage request (e.g., the file and the identifier) may be uploaded to hybrid file system 110 using a HyperText Transfer Protocol ("HTTP") or another network message. Alternatively, the storage request may be submitted by an application with a write request to enter the file into storage. In any case, the request is received by hybrid file system 110.

Process 800 may include computing (at 815) a checksum of the file. The checksum identifies an exact state of the file. The checksum may be computed based on the contents of the file, the file metadata, the file properties, or some combination thereof. Computing (at 815) the file checksum may include hashing the file, the file metadata, the file properties, or some combination thereof to produce a character string that represents the current state of the file. If any aspect of the file changes (e.g., file metadata, file contents, etc.), the file checksum will change as well.

Process 800 may include determining (at 820) whether the file already exists in storage. The determination (at 820) may involve comparing the computed checksum against checksum of files stored on one or more storage devices under control of hybrid file system 110. For instance, hybrid file system 110 may query a database using the computed checksum to quickly determine whether a copy of the file already exists in storage. In some embodiments, the query can be performed against the checksums in a particular directory when all files or files of a particular metadata-defined path are stored in the particular directory. In some other embodiments, the checksum may be used to define a directory path where an existing copy of the file may be found. For instance, the first three characters of the checksum may define a first-level directory, and the next three characters of the checksum may define a second-level directory. Hybrid file system may then query within the first-level directory and the second-level directory to determine (at 820) if the computed (at 815) checksum is present in the directory.

In response to determining (at 820—Yes) that a copy of the file with the exact same contents and/or state exists in storage (e.g., the checksum of the received file matches to a checksum of a stored file), process 800 may skip writing the received file to storage. In response to determining (at 820—No) that a copy of the file with the exact same contents and/or state does not exist in storage, process 800 may include writing (at 830) the file and its corresponding checksum to a storage location that may differ than the path provided with the storage request. In some embodiments, hybrid file system 110 may write the received file and the checksum to the same storage device and the same directory as all other stored files. In some other embodiments, hybrid file system 110 may write the received file and the checksum to a storage device and directory that is selected based on the checksum of the received file. As noted above, hybrid file system 110 may use different parts of the checksum (e.g., different sets of characters) to specify the actual storage location of the file. In any case, hybrid file system 110 ensures that only a single copy of the same file is stored, regardless of whether that file is uploaded, stored, or accessed using different logical paths.

Process 800 may include determining (at 840) whether an entry exists that maps the provided logical path for storing and accessing the file to the actual storage location of the file. In other words, determining (at 840) whether the identifier provided with the storage request specifies a new logical access path that was not previously associated with accessing the received file. The determination (at 840) may include searching database 640 with the computed checksum, and determining if database 640 stores a mapping that links the file checksum to the logical path (e.g., metadata-defined path, metadata-user-defined path, or user-defined path) that was submitted with the storage request.

In response to determining (at 840—Yes) that a mapping between the logical path and physical storage path exists, process 800 may include determining (at 860) if the provided identifier or logical path is a metadata-defined path or a metadata-user-defined path. In response to determining (at 840—No) that the mapping does not exist, process 800 may include generating (at 850) an entry in database 640 that links the provided identifier to the file checksum and/or the actual storage location of the file. In some embodiments, the actual storage location of the file may be derived directly from the file checksum such that the actual storage location need not be stored separate from the file checksum. After generating (at 850) the entry, process 800 may include determining (at 860) if the provided identifier or logical path is a metadata-defined path or a metadata-user-defined path.

In response to determining (at 860—Yes) that the provided identifier or logical path is a metadata-defined path, process 800 may include signaling (at 880) that the storage request has been successfully completed. Otherwise, hybrid file system 110 may determine (at 860—No) that the provided identifier or logical path is a hybrid metadata-user-defined path (or a user-defined path), and process 800 may include generating (at 870) a second entry in database 640 that links the file checksum and/or the actual storage location of the file to at least one metadata-defined path that may derived from a provided metadata-user-defined path, or that may be derived from the metadata of the received file. Process 800 may then signal (at 880) that the storage request has been successfully completed.

The storage process of FIG. 8 allows for different versions of the same file to simultaneously exist in storage which may be desired form of operation for hybrid file system 110. In this instance, users would manually delete older versions of a file. In response to a delete operation targeting a particular file, hybrid file system 110 may compute the checksum of the particular file, locate the single stored instance of the particular file based on the checksum, delete the single stored instance of the particular file from storage, and then remove any logical access path links to the particular file checksum.

Figure 9:
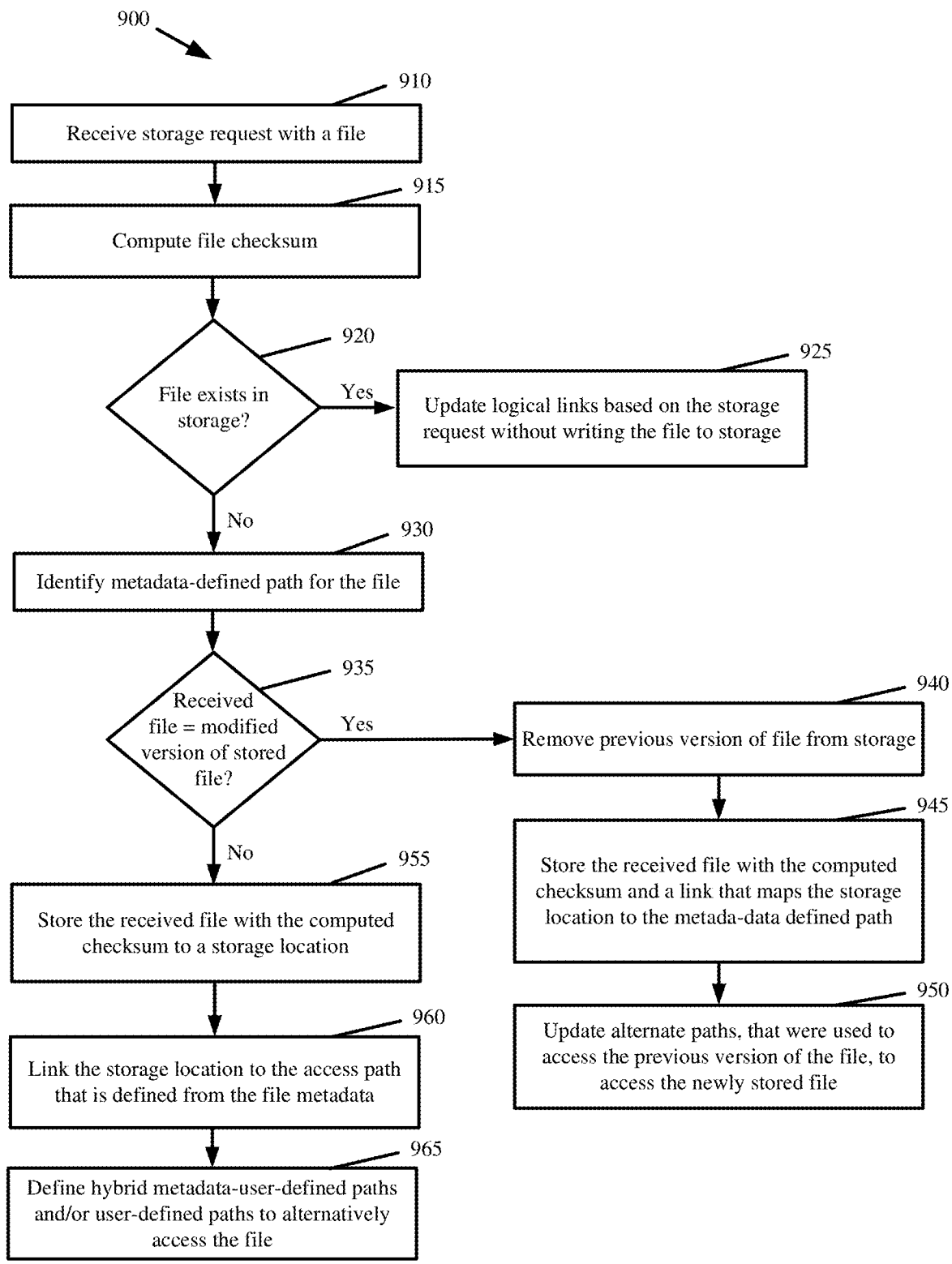
FIG. 9 presents a process for storage operations that replace earlier versions of a file in accordance with some embodiments presented herein.

In some embodiments, user may prefer that hybrid file system 110 replace earlier versions of a file when uploading or storing a new version of the same file. FIG. 9 presents a process 900 for storage operations that replace earlier versions of a file in accordance with some embodiments presented herein. Process 900 may be implemented by hybrid file system 110, alone or in combination, with database 640 or other databases.

Process 900 may include receiving (at 910) a storage request (e.g., a file and an identifier or URL for where to logically store and/or access the file). Process 900 may include computing (at 915) a checksum of the file.

Process 900 may include determining (at 920) whether the file already exists in storage by comparing the computed checksum against checksum of files stored on one or more storage devices under control of hybrid file system 110.

In response to determining (at 920—Yes) that a copy of the file with the exact same contents and state exists in storage (e.g., the checksum of the received file matches to a checksum of a stored file), process 900 may include updating (at 925) any logical links based on the storage request without writing the file to storage. Process 900 may additionally include providing notification that the storage operation was successfully completed.

In response to determining (at 920—No) that a copy of the file is not already in storage because the computed checksum does not match the checksums of stored files, process 900 may include identifying (at 930) a metadata-defined access path for the file. The metadata-defined access path may be identified from the identifier of the storage request or from the metadata of the received file. Process 900 may include determining (at 935) whether the received file is a modified version of a stored file based on the metadata-defined path. To make this determination (at 935), hybrid file system 110 may track whether the metadata-defined path already stores a file with the same name, and/or whether the user providing the file previously accessed a file with the same name from that metadata-defined path.

In response to determining (at 935—Yes) that the received file is a modified version of a stored file, process 900 may include removing (e.g., deleting or purging) (at 940) the previous version of the stored file from the storage device, storing (at 945) the received modified version of the file on the storage device with the computed checksum and a link that maps the storage location to the metadata-defined path, and updating (at 950) user-defined paths or metadata-user-defined paths, that were used to access the previous version of the file, so that they may be linked to and used to access the new version of the file.

In response to determining (at 935—No) that the received file is not a modified version of a stored file, process 900 may include storing (at 955) the file with the computed checksum to a particular storage location on a storage device, and linking (at 960) the particular storage location to the metadata-data defined path and/or the logical path provided with the storage request. Process 900 may include optionally defining (at 965) one or more hybrid metadata-user-defined paths, that are based on the metadata-defined path, and/or user-defined paths to alternatively access the file alone or in conjunction with different sets of other files. The sets of other files may include files that are grouped from the same metadata-defined path as the newly stored file, or may include files that are grouped from at least one other metadata-defined path.

In some embodiments, hybrid file system 110 supports using the user-defined paths to specify the exact location of files on different storage devices, while using the metadata-defined paths and hybrid metadata-user-defined paths to provide an alternate organization and method of accessing the same files. For instance, users may store files on storage devices of their local machines via user-defined paths, wherein the storage devices may use the user-defined paths to specify the actual storage location of the files.

The files on the user local machines may then be uploaded with metadata to hybrid file system 110 or otherwise included as part of an enterprise-wide storage system. Hybrid file system 110 may organize and provide access to the files on different user local machines using metadata-defined paths. For instance, hybrid file system 110 may map each metadata-defined path, that can be used to access a set of files with common metadata key-value pairs, to the individual user-defined paths for accessing each file of the set of files from the different user local machines. In other words, hybrid file system 110 may store a link between a metadata-defined path and multiple user-defined paths that contain the files for that metadata-defined path, and may also store the checksums of the individual files within the user-defined paths that have the metadata key-value pairs specified by the metadata-defined path. This dual-method of accessing files via hybrid file system 110 is illustrated in FIG. 1 above. Accordingly, users may use either the user-defined paths or the metadata-defined path to access the same files, or users may use the user-defined paths to access files on their local machines and the metadata-defined path to access files on machines of other users.

Figure 10:
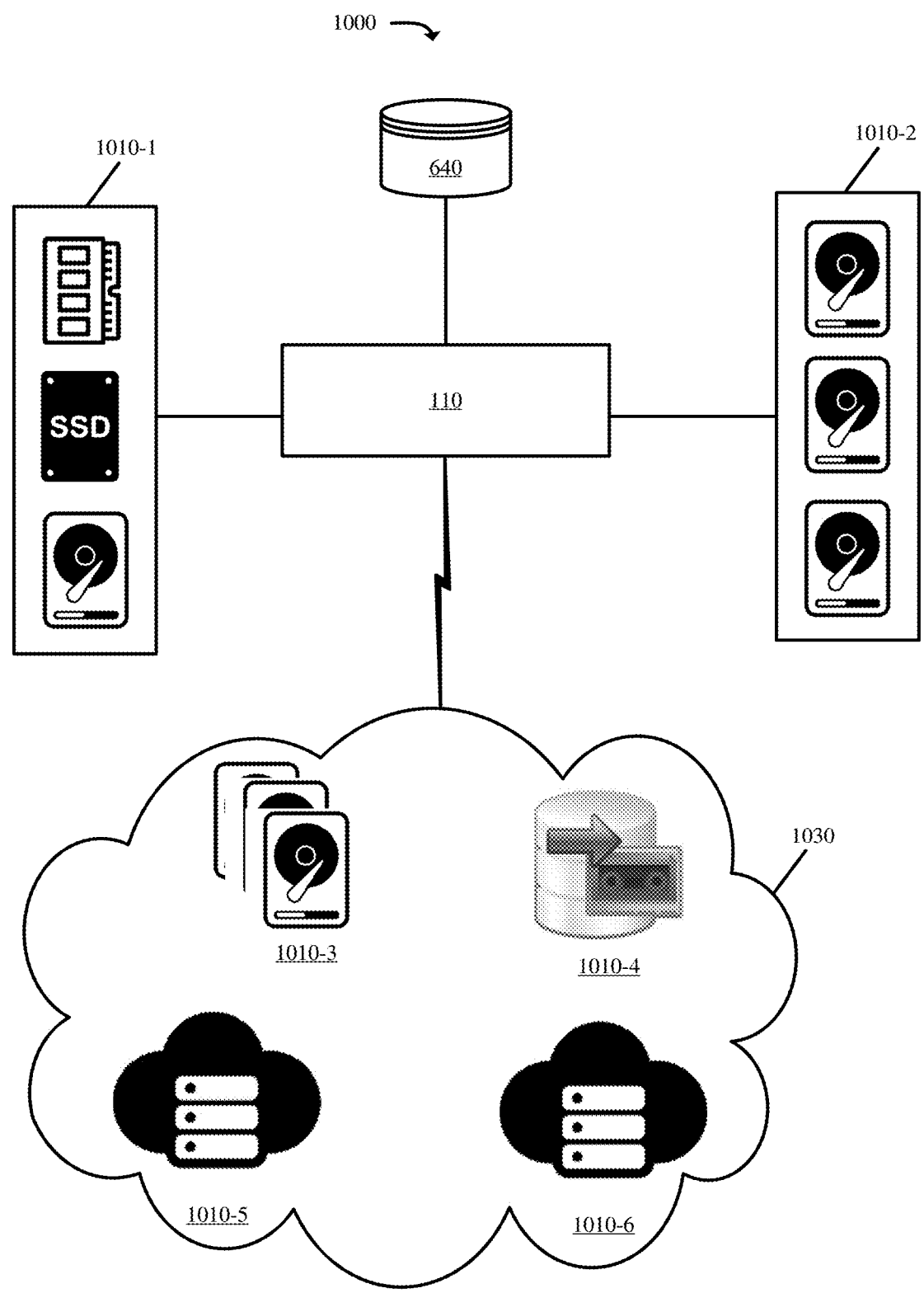
FIG. 10 illustrates an example environment in which one or more embodiments, described herein, may be implemented.

FIG. 10 illustrates an example environment 1000 in which one or more embodiments, described herein, may be implemented. As shown in FIG. 10, environment 1000 may include hybrid file system 110, storage devices 1010-1, 1010-2, 1010-3, 1010-4, 1010-5, and 1010-6 (herein sometimes collectively referred to as "storage devices 1010" or individually as "storage device 1010"), database 640, and network 1030.

The quantity of devices, components, and/or networks, illustrated in FIG. 10, is provided for explanatory purposes only. In practice, environment 1000 may include additional devices, components, and/or networks; fewer devices, components, and/or networks; different devices, components, and/or networks; or differently arranged devices, components, and/or networks than illustrated in FIG. 10. For example, storage devices 1010 may have different tiered arrangements based on cost, performance, location, and/or other characteristics of storage devices 1010. One or more of the devices of environment 1000 may perform one or more functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000. For instance, hybrid file system 110 may be implemented on a machine with one or more of storage devices 1010.

As described above, hybrid file system 110 may be used to manage access and storage of files across storage devices 1010 using one or more metadata-defined paths, hybrid metadata-user-defined paths, and/or user-defined paths. Hybrid file system 110 may be a centralized or a distributed file system that runs on one or more devices. For instance, hybrid file system 110 may run from a device in an organization that other user devices submit file access requests to in order to access files stored across storage devices 1010. Hybrid file system 110 may also be run on each machine that hosts one or more of storage devices 1010. In some such embodiments, each instance of hybrid file system 110 may manage files across storage devices 1010 that are under its control.

Storage devices 1010 may include storage devices, systems, and/or components that may be differentiated based on one or more characteristics. For instance, storage devices 1010 may be differentiated based on storage size, performance (e.g., read speed, write speed, seek time, network latency, etc.), cost, location, and/or other characteristics. Storage devices 1010 may include local storage devices (e.g., storage devices 1010-1 and 1010-2) that may be on the same physical machine or may be interfaced directly to the machine generating the file access requests or the machine running hybrid file system 110. Storage devices 1010 may also include remote storage devices (e.g., storage devices 1010-3, 1010-4, 1010-5, and 1010-6) that process access requests submitted over network 1030 from one or more user devices or that process commands from hybrid file system 110 over network 1030.

Remote storage devices 1010-3, 1010-4, 1010-5, and 1010-6 may include storage devices of one or more cloud-based systems. A cloud-based system may provide hybrid file system 110 with a changing amount of storage by dynamically allocating or deallocating storage from the cloud-based system.

Storage devices 1010 may include any kind, type, or mix of storage devices. For instance, storage devices 1010 may include magnetic disk drives, solid state drives, Random Access Memory (RAM), optical storage devices, and/or storage devices that use other storage technologies or storage mediums. Storage devices 1010 may further include storage devices of different cloud-based systems that may provide long-term, slow, and/or data archival storage versus low latency, more expensive, and localized storage. In any case, hybrid file system 110 may access, manage, and/or control each storage device 1010 via a local interface or via network 1030.

Database 640 may be used to store the different taxonomies used by hybrid file system 110 for tagging files with classifying metadata, and may also be used for storing the mapping between the logical paths (e.g., the metadata-defined paths, the metadata-user-defined paths, and/or user-defined paths) and the physical storage locations of the files. In particular, for each logical path, database 640 may store the files or checksums of the files that may be accessed using that logical path as well as the storage locations of those files. Database 640 may also store access permissions associated with each defined access path. The access permissions specify which users or devices can access files using a particular access path. In some embodiments, database 640 may be integrated as part of hybrid file system 110 (e.g., in memory of hybrid file system 110), or may be remotely accessed by hybrid file system 110.

Network 1030 may allow devices of environment 1000 to access one or more other networks or devices, a core network of a wireless telecommunications network, an Internet Protocol-based packet data network ("PDN"), a wide area network ("WAN") such as the Internet, a private enterprise network, and/or one or more other networks. In some implementations, network 1030 may include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. Network 1030 may be connected to, and/or otherwise in communication with, one or more other networks, such as a public switched telephone network ("PSTN"), a public land mobile network ("PLMN"), and/or another network. Different user devices may submit file access requests (e.g., read and write requests) to hybrid file system 110 via network 1030, and hybrid file system 110 may distribute files and access files from storage devices 1010 via network 1030.

Figure 11:
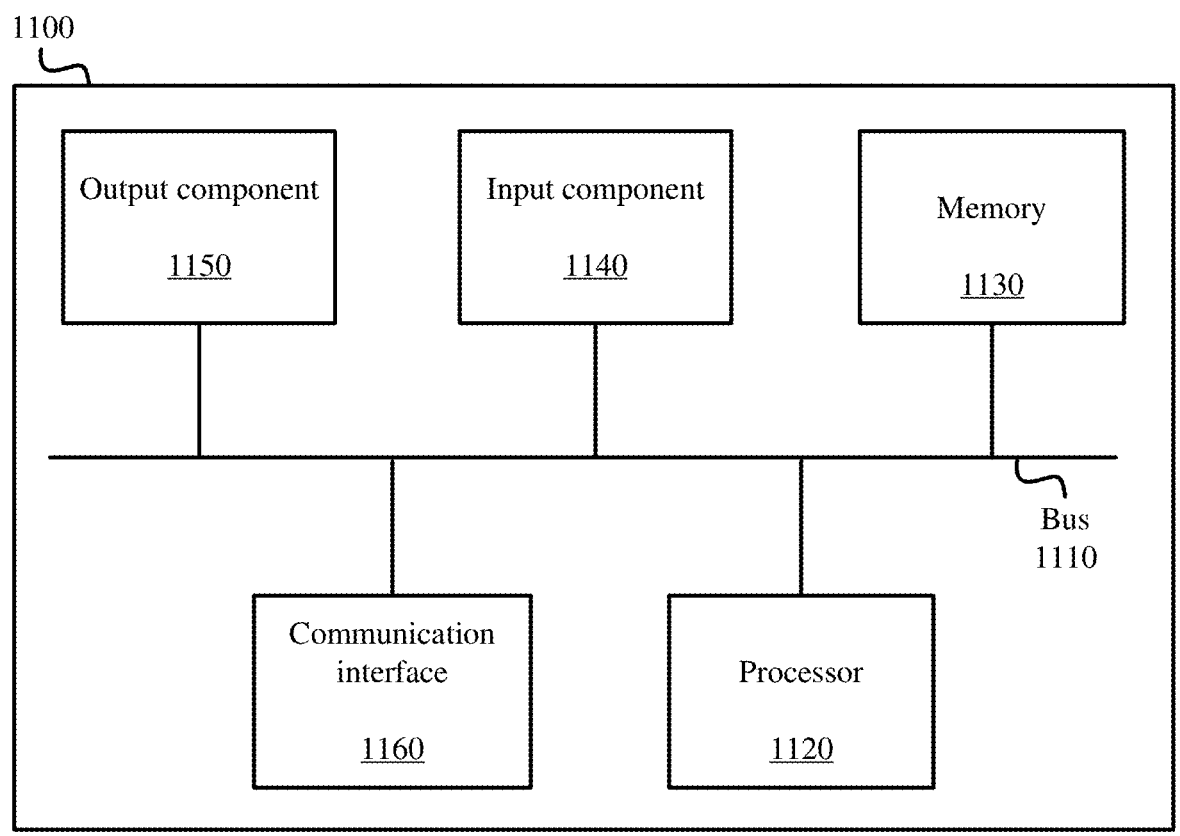
FIG. 11 illustrates example components of one or more devices, according to one or more embodiments described herein.

FIG. 11 is a diagram of example components of device 1100. Device 1100 may be used to implement the hybrid file system 110 or a machine on which hybrid file system 110 executes. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:
  storing a first file to a first directory that is accessible via a first path;
  storing a different second file to a different second directory that is accessible via a second path that is different than the first path;
  determining that the first file, that is accessed via the first path, and the second file, that is accessed via the second path, are part of a particular workflow;
  tagging the first file and the second file with a first set of metadata as identifiers of the particular workflow in response to said determining, wherein the first set of metadata is different than the first directory, the first path, the second directory, and the second path;
  defining a metadata access path to access both of the first file from the first path and the first directory, and the second file from the second path and the second directory, wherein defining the metadata access path comprises forming the metadata access path from the first set of metadata that is tagged to the first file and the second file, and wherein the metadata access path is different than the first path and the second path; and
  providing access to the first file and the second file in response to a user accessing the particular workflow, wherein providing the access comprises mapping from the metadata access path, that is associated with the particular workflow, to the first path for the first file and the second path for the second file.

2. The method of claim 1 further comprising:
  receiving a first access request that is directed to the first path;
  providing access to the first file in the first path in response to the first access request; and
  wherein providing access to the first file and the second file comprises responding to a second access request that is directed to the metadata access path.

3. The method of claim 1, wherein providing the access further comprises:
  retrieving an instance of the first file from the first directory, that is accessed via the first path, in response to the user accessing the particular workflow;
  retrieving an instance of the second file from the second directory, that is accessed via the second path, in response to the user accessing the particular workflow; and
  distributing the instance of the first file and the instance of the second file to a device of the user.

4. The method of claim 1 further comprising:
  storing a third file to the first directory that is accessible via the first path;
  tagging the second file and the third file with a second set of metadata, wherein the second set of metadata is different than the first directory, the first path, the second directory, and the second path; and
  providing access to both the second file in the second directory and the third file in the third directory in response to an access request specified with the second set of metadata.

5. The method of claim 4, wherein providing access to both the second file and the third file comprises:
  excluding access to the first file in the first directory.

6. The method of claim 1, wherein defining the metadata access path further comprises:
  linking the metadata access path to the first file in the first directory and the second file in the second directory based on the first file and the second file being tagged with the first set of metadata that matches the first set of metadata of the metadata access path.

7. The method of claim 1 further comprising:
creating a taxonomy with a plurality of metadata tags, wherein the plurality of metadata tags comprises the first set of metadata tags and other tags that are unrelated to file properties and that are related to file contents;
wherein tagging the first file and the second file comprises associating the first set of metadata from the taxonomy to each of the first file and the second file without modifying the file contents of the first file or the second file.

8. The method of claim 1 further comprising:
receiving a modified version of the first file as part of a write request specified with the first set of metadata; and
storing the modified version of the first file in the first directory in response to the write request.

9. The method of claim 8, wherein storing the modified version of the first file comprises:
removing the first file from the first directory as part of the write request specified with the first set of metadata; and
writing the modified version of the first file to the first directory.

10. The method of claim 1,
wherein the first path and the metadata access path are different paths; and
wherein the first path and the metadata access path provide access to a same single stored instance of the first file without duplication of the first file.

11. The method of claim 1, wherein providing access comprises:
accessing the first file from the first directory via the first path and the second file from the second directory via the second path in response to an access request that is directed to the metadata access path and that issues as a result of the user accessing the particular workflow.

12. The method of claim 1 further comprising:
computing a checksum for each of a plurality of stored files, wherein computing the checksum comprises computing a first checksum for the first file and a second checksum for the second file;
linking the first checksum and the second checksum to the metadata access path; and
wherein providing access comprises retrieving the first file from the first directory via the first path and the second file from the second directory via the second path based on an access request specifying the metadata access path and the metadata access path being linked to the first checksum and the second checksum.

13. The method of claim 1 further comprising:
computing a checksum for each of a plurality of stored files, wherein computing the checksum comprises computing a first checksum for the first file and a second checksum for the second file;
linking the first checksum and the second checksum to the metadata access path;
creating a first pointer that links the first checksum to the first file in the first path and a second pointer that links the second checksum to the second file in the second path; and
wherein providing access comprises traversing the first pointer to the first file in the first directory and the second pointer to the second file in the second directory.

14. The method of claim 1, wherein providing access comprises:
converting the metadata access path to the first path and a first identifier used in identifying the first file; and
converting the metadata access path to the second path and a second identifier used in identifying the second file.

15. The method of claim 14, wherein the first identifier is a first checksum of the first file and the second identifier is a second checksum of the second file.

16. The method of claim 1, wherein providing access comprises:
mapping a logical path that is specified using the metadata access path to physical storage paths of the first path for the first file and the second path for the second file.

17. The method of claim 1 further comprising:
defining access permissions for the metadata access path;
wherein providing access comprises:
accessing the first file and the second file in response to the user or a first user device of the user having access permissions to access the metadata access path; and
preventing access to the first file and the second file in response to the user or a second user device of the user not having access permissions to access the metadata access path.

18. A system comprising:
one or more processors configured to:
store a first file to a first directory that is accessible via a first path;
store a different second file to a different second directory that is accessible via a second path that is different than the first path;
determine that the first file, that is accessed via the first path, and the second file, that is accessed via the second path, are part of a particular workflow;
tag the first file and the second file with a first set of metadata as identifiers of the particular workflow in response to said determining, wherein the first set of metadata is different than the first directory, the first path, the second directory, and the second path;
define a metadata access path to access both of the first file from the first path and the first directory, and the second file from the second path and the second directory, wherein defining the metadata access path comprises forming the metadata access path from the first set of metadata that is tagged to the first file and the second file, and wherein the metadata access path is different than the first path and the second path; and
provide access to the first file and the second file in response to a user accessing the particular workflow, wherein providing the access comprises mapping from the metadata access path, that is associated with the particular workflow, to the first path for the first file and the second path for the second file.

19. A non-transitory computer-readable medium, storing a set of processor-executable instructions, which, when executed by one or more processors, cause the one or more processors to:
store a first file to a first directory that is accessible via a first path;
store a different second file to a different second directory that is accessible via a second path that is different than the first path;

determine that the first file, that is accessed via the first path, and the second file, that is accessed via the second path, are part of a particular workflow;

tag the first file and the second file with a first set of metadata as identifiers of the particular workflow in response to said determining, wherein the first set of metadata is different than the first directory, the first path, the second directory, and the second path;

define a metadata access path to access both of the first file from the first path and the first directory, and the second file from the second path and the second directory, wherein defining the metadata access path comprises forming the metadata access path from the first set of metadata that is tagged to the first file and the second file, and wherein the metadata access path is different than the first path and the second path; and provide access to the first file and the second file in response to a user accessing the particular workflow, wherein providing the access comprises mapping from the metadata access path, that is associated with the the particular workflow, to the first path for the first file and the second path for the second file.

* * * * *